Aug. 15, 1933.    G. D. PARKER    1,923,012
RAISING AND LOWERING DEVICE
Filed May 2, 1927    5 Sheets-Sheet 1

Inventor
George D. Parker

By    Lyon & Lyon
    Attorneys

Aug. 15, 1933.    G. D. PARKER    1,923,012
RAISING AND LOWERING DEVICE
Filed May 2, 1927    5 Sheets-Sheet 2

Aug. 15, 1933.   G. D. PARKER   1,923,012
RAISING AND LOWERING DEVICE
Filed May 2, 1927   5 Sheets-Sheet 3

Inventor
George D. Parker
By Lyon & Lyon
Attorneys

Aug. 15, 1933.    G. D. PARKER    1,923,012
RAISING AND LOWERING DEVICE
Filed May 2, 1927    5 Sheets-Sheet 5

Inventor
George D. Parker
By Lyon & Lyon
Attorneys

Patented Aug. 15, 1933

1,923,012

UNITED STATES PATENT OFFICE 1,923,012

RAISING AND LOWERING DEVICE

George D. Parker, Riverside, Calif.; Clara B. Parker executrix of said George D. Parker, deceased Application May 2, 1927. Serial No. 188,255

23 Claims. (Cl. 103—212)

This invention is of the nature of hoisting and lowering apparatus, and the invention is very useful when applied to deep well pumps and particularly to pumps for oil wells. It has been the general custom to pump such wells by means of a walking beam, the end of which supports and reciprocates the pump rod. While this method is satisfactory for shallow wells, it is found that when wells have great depth, difficulties arise by reason of the great length and weight of the pump rod, and these difficulties are aggravated by the elasticity of the rod, which on the upstroke elongates considerably. This elongation causes a loss of efficiency in the pump. It has been attempted to overcome this difficulty by increasing the length of stroke of the pump, but the limit of the length of the stroke is small where the pump rod is operated by a walking beam. Other methods for developing a deep well pump with a long stroke have generally been unsatisfactory.

The general object of this invention is to produce a deep well pumping apparatus which will enable the pump to have a relatively long stroke; also to provide a pumping apparatus of this kind in which the stroke of the pump is practically limited only by the height of the derrick.

One of the objects of the invention is to provide simple means for developing a long stroke in a pump rod by means of a cable and without necessitating the use of a great number of sheaves about which the cable must pass.

In the preferred embodiment of the invention, it involves the use of a drum carrying coils of the cable which supports a weight to be raised and lowered, for example, a pump rod, and in the operation of the mechanism the rotation of the drum in one direction raises the pump rod or other article during the upstroke of the pump; at the end of the upstroke the pump rod is permitted to descend by gravity and during its descent uncoils the cable from the drum and rotates the drum in a reverse direction. One of the objects of this invention is to provide means for permitting this mode of operation and to provide a construction whereby at the end of the downstroke of the pump rod, the drum carrying the cable will operate to raise the pump rod for the upstroke without being reversed, that is to say, to provide an apparatus in which the drum rotates in the same direction during the upstroke of the plunger or pump rod as in the preceding downstroke; also to provide means for preventing undue acceleration of the pump rod and drum on the downstroke. In accomplishing this, when an electric motor is employed for operating the drum, one of the objects of the invention is to provide a switch control for the motor which will enable it to retard the acceleration of the pump rod and drum on the downstroke and at the same time operate as a generator brake so that the energy developed by the motor while it is giving its retarding or braking action will pass into the circuit, thereby reducing to a minimum the energy losses due to the retarding action.

In operation of the preferred form of this device, the cable that operates the pump rod is attached to the surface of a drum near the middle point of the drum and the cable wraps first on one end of the drum and then on the other. When the plunger reaches the limit of its down stroke the drum continues to rotate in the same direction and wraps the cable on the other end of the drum. When this occurs, there is a considerable pull on the anchorage of the cable to the surface of the drum, tending to pull the anchorage of the cable loose. This would, of course, permit the pump rod to fall into the well. One of the objects of this invention is to provide means cooperating with the cable to prevent the loss of the rod in case the anchorage of the cable to the drum should be pulled out. A further object of the invention is to provide means for operating the drum in such a way as will tend to reduce the pull of the cable on its anchorage when the reversal of movement of the pump rod takes place at the end of its down stroke.

Further objects of the invention will appear hereinafter.

The invention consists of the novel parts and combination of parts to be described hereinafter, all of which contribute to produce an efficient deep well pump.

A preferred embodiment of the invention is described in the following specification, while the broad scope of the invention is pointed out in the appended claims.

In practicing my invention as applied to a deep well pump, I provide apparatus in which the pump rod is supported on a cable coiled upon a drum, and in the operation of the apparatus, on the downstroke the pump rod descends by gravity. The apparatus is so constructed that in its descent undue acceleration of the pump rod is prevented, and while the pump rod is at or about the lower end of its downstroke, driving power is supplied to the drum to effect the raising of the pump rod for the upstroke. Any suitable means may be employed for preventing undue acceleration of the pump rod on the downstroke, but this may be very simply accomplished by using an electric motor to develop the driving power and utilizing this motor as a generator brake on the downstroke of the pump. In this way the undue acceleration of the pump rod is prevented and at the same time electromotive force is developed in the motor circuit, which is discharged into the service circuit or other electric circuit serving the apparatus.

On the upstroke, the driving power effects the upward movement of the pump rod, but at or about the end of the upstroke the driving power is shut off, so as to enable the pump rod to commence its descent by gravity on the downstroke. When an electric motor is used for driving a pump rod, the shutting off of the power is accomplished simply by opening the switch of the motor circuit. However, this switch is only held open temporarily, and is soon closed automatically so as to enable the motor to operate as a generator brake, as suggested. In order to accomplish this control of the switch I provide an automatically actuated controlling member or actuator which throws the switch open for a moment and then moves the switch to close a circuit adapted to drive the motor in the opposite direction from the direction of rotation which the motor has in raising the pump rod. In this connection it should be understood that as soon as the pump rod commences its descent the uncoiling of the cable from the drum rotates the drum and the motor in a reverse direction. This, however, is the only reversal of direction of rotation that occurs at the drum.

According to my invention, I combine the cable and drum in such a way that when the pump rod arrives at the bottom of its stroke the drum is not reversed to raise the pump rod but simply continues to rotate in the same direction. When this occurs, the cable coils on the drum in a reverse way. In other words, in the embodiment of the apparatus disclosed in this specification, the cable which has been coiled upon the drum during the upstroke uncoils itself during the downstroke, and when the end of the downstroke occurs the cable will be completely uncoiled from the drum and the drum will then continue to rotate in the same direction and this re-coils the cable upon the drum but in the opposite direction, so that the drum will then raise the pump rod for the upstroke.

In operating a pump rod with a cable there is always some danger of the cable breaking, and if this occurred the pump rod would fall and might cause considerable injury to the well. In order to prevent such an accident I provide a clamping device which automatically grabs the pump rod in case the cable breaks or becomes slack. This clamp device is controlled automatically by a device which is maintained in a normal position by the taut cable. The idea is, if the cable breaks or becomes slack, it permits this control device to move and cause the operation of the clamp to grab the pump rod.

Figures 1, 16:
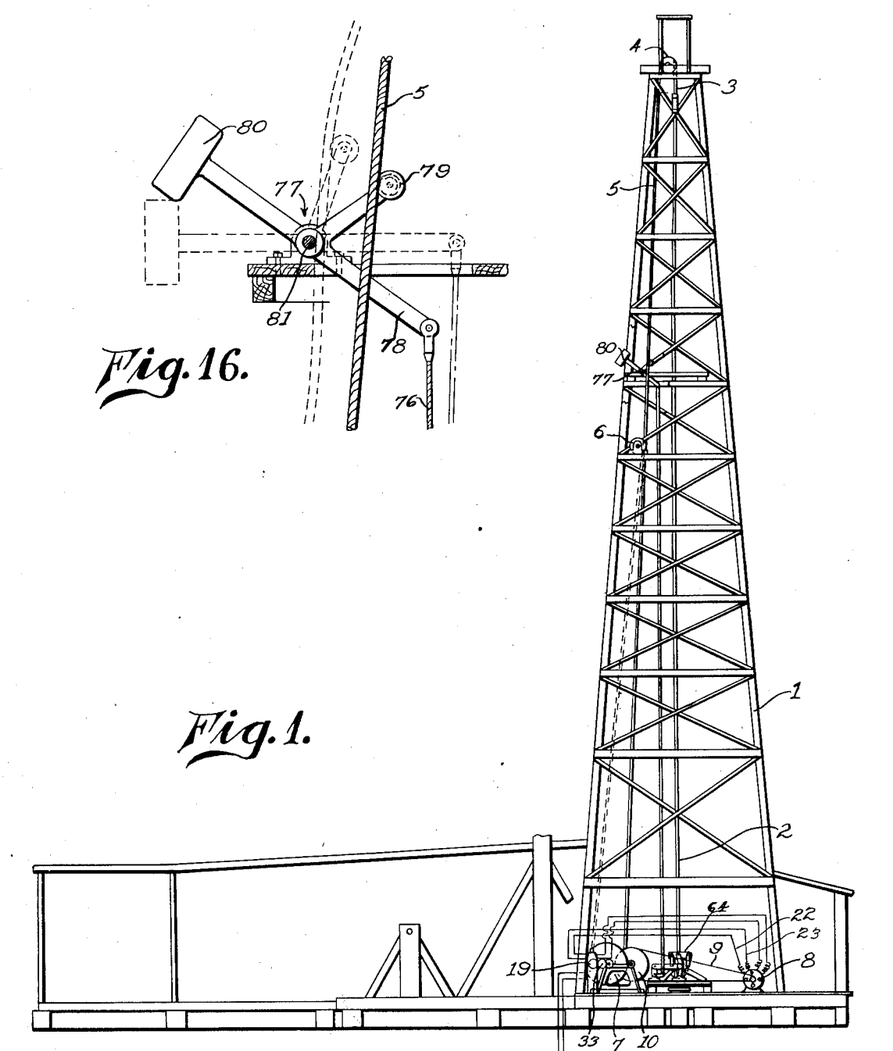
Figure 1 is a side elevation of a pumping apparatus and derrick embodying my invention.
Figure 16 is a vertical section taken at the control device which operates in conjunction with the cable to actuate the gripping or clamping device when the cable becomes slack.
Figures 2, 3, 4, 5:
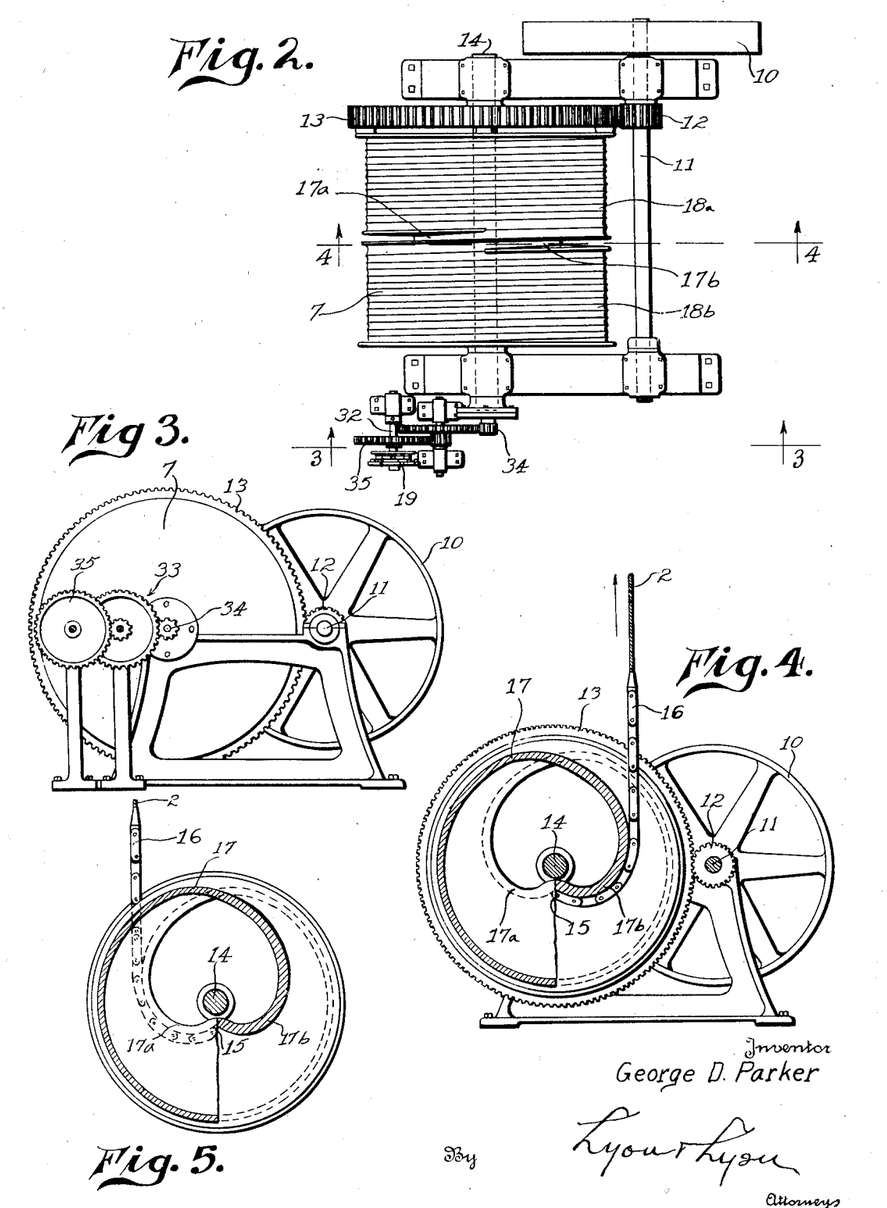
Figure 2 is a plan of a drum hoist such as I employ for carrying the coils of the cable that is used to operate the pump rod.
Figure 3 is an end elevation of the drum hoist shown in Figure 2.
Figure 4 is a vertical cross section through the drum hoist taken about on the line 4—4, Figure 2, and showing the relation of the cable to the drum when the pump rod is nearing the end of the downstroke.
Figure 5 is a view similar to Figure 4 by indicating the relation of the cable to the drum immediately after the upstroke of the pump rod has begun.

Apparatus which I prefer to employ in accomplishing the purposes of my invention includes the derrick 1 of common construction, which is erected over the well, from which a polish rod or pump rod 2 extends upwardly. The weight of this pump rod is suspended on a cable 3 which passes over a crown sheave 4; from the crown sheave the cable passes downwardly in a run 5 and over the edge of a guide pulley or sheave 6 from which point the cable passes downwardly and onto a cable drum 7. This cable drum may be driven by any type of prime mover in which the power delivering member may be reversed by any means in timed relation to the stroke of the pump, thereby accomplishing the same results as by the specific means herein described, but I prefer to drive it by means of an electric motor 8 which drives the drum through the medium of a belt 9 passing over a belt wheel 10. The shaft 11 of this belt wheel carries a pinion 12 (see Figure 2) which drives a large gear 13 on the drum shaft 14. The cable 2 is connected to the face of the drum 7 at an intermediate point on the length of the drum. As illustrated in Figure 4, the end of the cable is attached to the drum at a connecting point 15, but the cable 2 is not attached directly to the drum but its end is attached to a short length of chain 16 formed of links which can be bent around a relatively small radius. The reason for this will be described hereinafter. When the downstroke is occurring the cable 2 will be located for example, at the right-hand side of the drum, and the pull on the cable due to the descent of the rod will be in the direction indicated by the arrow in Figure 4. As the connecting point 15 moves around to the upper side of the drum, no further downward movement of the pump rod can occur. As the drum continues its rotation in the same direction, the cable 2 will then move over to the left side of the drum, as indicated in Figure 5, and the drum will commence to coil up the cable for the upstroke.

The apparatus is provided with means for gradually arresting the downward movement of the plunger and gradually commencing the upstroke. This is necessary so as to absorb the momentum of the moving rod in coming down and overcome its inertia in starting up. The means for this purpose is preferably associated with the connection between the cable and the drum and consists in providing the drum with a waist 17 of relative reduced dimensions, and this waist is in the form of a heart-shaped cam, the re-entrant portion or recess in the periphery of the heart corresponding to the point 15, which is the point of attachment of the end of the chain. In other words, the point 15 is located at a relatively short radius from the axis of the drum shaft 14, and from this point the surface of the waist 17 constitutes two cams, 17a and 17b, one of which extends in a right-hand direction, as viewed in Figure 4, and the other in a left-hand direction. These cams form the adjacent ends of two helical cable grooves, 18a and 18b, that is to say, as the cam 17a takes up the chain and the coils of the cable it will operate to guide the cable onto the cable grooves 18a, and vice versa.

Figures 6, 7, 8:
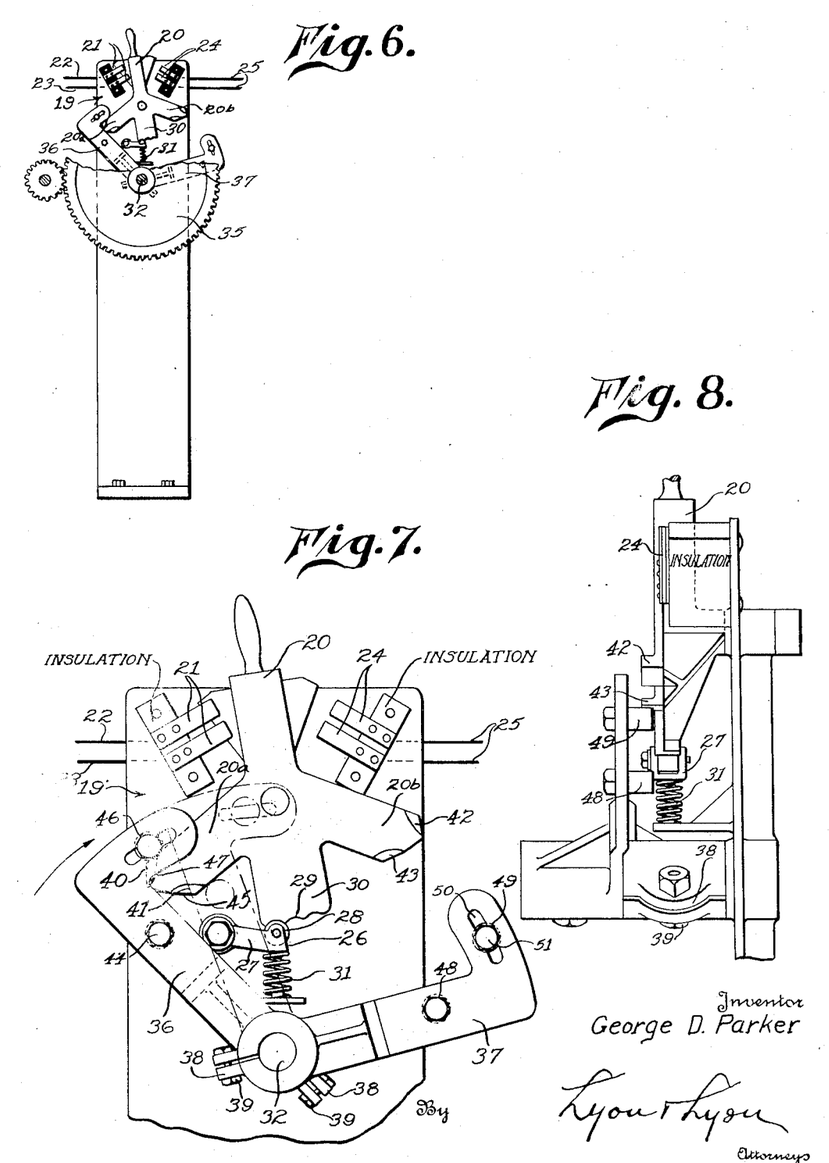
Figure 6 is an end elevation of a double throw switch which I prefer to use for automatically controlling the motor circuit.
Figure 7 is a view showing this switch, but upon an enlarged scale, certain parts being broken away.
Figure 8 is an edge elevation of the switch and illustrating the parts shown in Figure 7.

In order to control the motor circuits, I provide an automatic switch device 19 which is preferably in the form of a double-throw switch, having a lever 20, which may occupy a neutral position in which there is no circuit closed through the motor, and which has two other extreme positions in which the lever is swung to the right or to the left. In Figure 7 the lever is illustrated as swung to the left and is in engagement with two contacts 21 which close a circuit through the motor through the wires 22 and 23. This circuit is the circuit for driving the motor ahead, that is to say, in the direction which will operate to wind up the cable on the drum and raise the pump rod. However, this particular direction of rotation for the motor will lower and then raise the pump rod. This results from the characteristic mode of operation of this apparatus. If the switch lever 20 is moved over to the opposite position from that which is shown in Figure 7, it will engage the contacts 24 and close the circuit through the wires 25 and through the motor, which would drive the motor in a reverse direction.

In practice, if desired, magnetic relay switches for high voltage with this switch on one lead only, could be used to avoid burning of contact points.

The switch includes a yielding detent device 26 for holding the switch lever 20 in any one of the three positions. This device includes a lever 27 which is provided with a roller 28 which may engage any one of three notches 29 on the tail arm 30 of the lever. The coil spring 31 operates to press this roller up so as to hold it yieldingly in any one of the notches.

In order to actuate this lever automatically so as to throw open the electric circuit through the motor as the pump rod arrives at the upper limit of the upstroke, and to close the circuit again soon after the rod has commenced its descent so as to exert a braking force on the descent of the rod, the switch device includes a shaft 32 which is driven at a reduced speed through a gear train 33 (see Figures 2 and 3). This gear train 33 is driven off a pinion 34 on the end of the drum shaft, and includes a large gear wheel 35 on the shaft 32. The proportion of this gearing 33 is such that the shaft 32 will make a fraction of one complete revolution during each double stroke of the pump. This shaft is provided with two arms 36 and 37 (Fig. 7) which throw the switch after the completion of each double stroke. These arms are adjustably mounted on the shaft 32 and by adjusting their position the length of the stroke of the pump can be regulated. Any suitable construction may be provided for adjustably attaching these arms. In the present instance, each arm has a split hub provided with flanges 38 and with bolts 39 for clamping the hub on the shaft. In the operation of the pump it should be understood that the cable in one upstroke will coil on one end of the drum and in the following upstroke will coil on the opposite end of the drum, and on each alternate upstroke the motor runs in the same direction, that is to say, assuming that the forward direction of rotation of the motor will wind the cable up on the lower end of the drum, as viewed in Figure 2, then on the next upstroke the motor will be running in the opposite direction and will wind the cable up on the upper end of the drum, as viewed in Figure 2. Of course, in the coiling in either direction of rotation, forward rotation is merely arbitrary, as either direction of rotation for the motor may be considered forward and the other reverse. The arms 36 and 37 and the switch lever 20 are correlated in construction, to control the switch lever as desired. In order to accomplish this, the switch lever 20 is provided with two cam arms 20a and 20b. These arms project laterally from the body of the lever (see Figure 7) and the end of each arm is provided with two cams, that is to say, the arm 20a is provided with two cams, 40 and 41, and two similar cams, 42 and 43, are provided at the end of the arm 20b. The arms 36 and 37 have pins or rollers which cooperate with these cams, as illustrated in Figure 7, for example, when the arm 36 is swinging upwardly and clockwise, as indicated by the arrow, and as the end of this upstroke is reached, a roller pin 44 on this lever will strike the face 45 of the cam 41 and move the lever up into its neutral position. Before this occurs, however, a roller pin 46, which is mounted on the arm 36 in a more advanced position (in respect to the direction of movement of the arm), will have moved past the cam 40. Throwing the switch to neutral position in this way, of course, opens the driving circuit through the wires 22 and 23 and the pump rod will then commence to descend by gravity, incidentally rotating the drum and the motor in a reverse direction. As soon as this downstroke of the pump rod commences, the pin roller 46 will engage the right-hand face 47 (see Fig. 7) of the cam 40, and this will swing the lever 20 over to its extreme right-hand position and close the circuit through the contacts 24 and the wires 25, thereby closing this circuit, which would drive the motor in the direction in which it is rotating. However, the motor is designed to run at a certain speed, and if the acceleration of the pump rod in its downward movement drives the motor beyond this speed, the motor will cease to operate as a motor and will develop resistance to its own rotation by commencing to operate as an electric generator, in a well known manner, thereby operating as a "generator brake" on the pump rod, developing current which is discharged into the electric circuit. Any well known wiring of the motor may be employed to accomplish this. When the downstroke of the pump rod is completed, all of the cable on the drum will have been uncoiled. When this occurs, the momentum of the drum and motor and the electric circuit through the motor will all operate to continue the rotation of the drum in the same direction; this will wind up the cable on the other end of the drum.

The arm 37 is provided with two pins 48 and 49 similar to the pins 44 and 46 of the arm 36, and these pins cooperate in the same way with the cams 42 and 43 as the pins 44 and 46 cooperate with their corresponding cams.

In order to control the time of closing of the switch to close the circuit through the motor on the downstroke of the pump, the pins 46 and 49 are adjustably mounted in circumferentially disposed slots 50. For this purpose each pin is provided with a clamping bolt 51 running in the slot. It will be evident that, by adjusting these pins 46 and 49 in the slots, the closing of the circuit through the motor at the commencing of the downstroke can be delayed later in the stroke or made earlier in the stroke, as may be desired.

Figures 9, 11, 12:
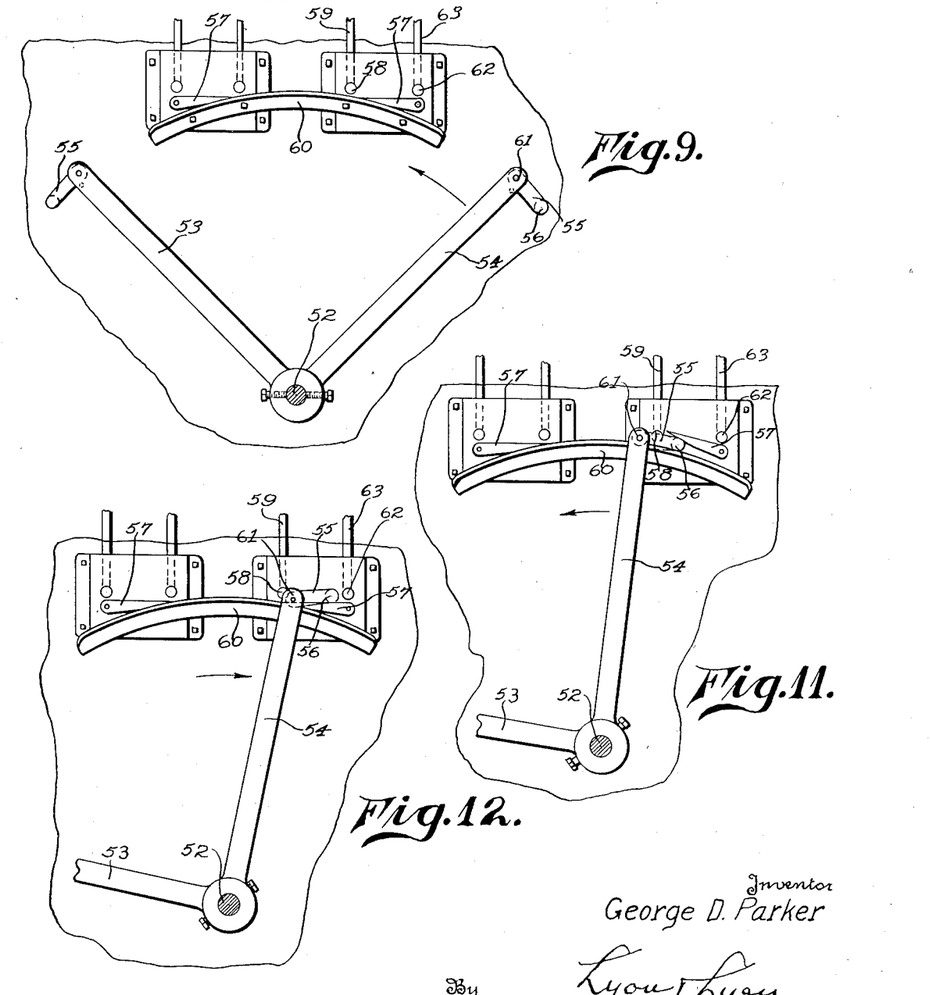
Figure 9 is a side elevation illustrating another type of switch which I may employ, certain parts being broken away.
Figures 11 and 12 are side elevations similar to Figure 9, but omitting certain parts; these figures illustrate different stages in the operation of the switch shown in Figure 9.
Figure 10:
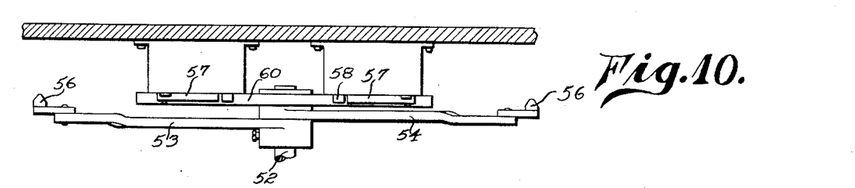
Figure 10 is a plan of the switch shown in Figure 9.
Figure 13:
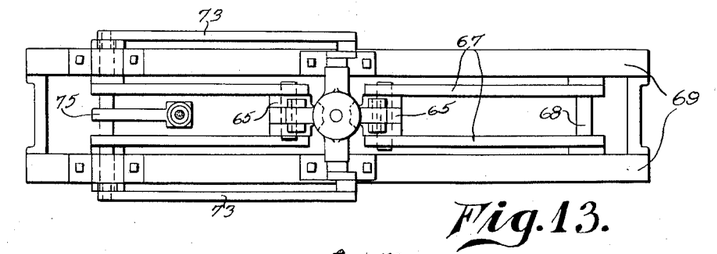
Figure 13 is a plan of a safety clamp device which is controlled by the cable which supports the pump rod and which operates automatically to support the pump rod in case the cable is broken or becomes slack.

The controlling switch may be of any suitable construction, and need not be constructed as illustrated in Figures 6 to 8, inclusive; for example. I may use a remote-control electric switch having features of construction such as illustrated in Figures 9 to 12, inclusive. This construction, however, would entail the use of a well-known type of electric switch employing electro-magnets located on opposite sides of the switch lever for throwing the switch. In this type of switch device the shaft 52 corresponds to the shaft 32, and would make a fraction of one complete revolution in each double stroke or cycle of movement of the pump rod. The controlling member of the switch comprises two arms 53 and 54, each arm being provided with a contact member 55. Assuming the direction of movement to be that indicated by the arrow in Figure 9, as the contact arm 55 is carried upwardly by the arm 54 its tip 56 would pass under a small pivoted switch bar or pawl 57 and come into contact with a push button 58. This would close the circuit through the wires 59, which would throw the switch to its neutral position. The end of the pawl 57 is supported on a fixed quadrant 60 and as the controller arm 54 moves backwardly, as indicated in Figure 12, the arm 55 would swing slightly on its pivot 61 and ride over the pawl in such a way as to come into contact with a push button 62 in its path and thereby close the circuit through the wires 63. This circuit would operate a solenoid to pull the switch lever over to its opposite position.

A device of this kind should be provided with a safety device which will operate to prevent loss of the pump rod in case the cable breaks. Any suitable means may be provided for this purpose. In the present instance I provide an automatic clamping device 64 (see Figures 1 and 13 to 15). This clamping device comprises two oppositely disposed jaws 65. Each of these jaws is mounted on a pivot pin 66 between two toggle arms 67, which are disposed in an inclined position, with their lower ends mounted on a fixed pin 68, secured in the frame bars 69 of the frame for this device. The jaws 65 are normally held up in an inoperative position by means of a floating spider 70 supported on toggle links 71, connected by a common pivot pin 72 to which a link 73 is attached. This link is attached to a bell crank lever 74 having a horizontal arm 75, which is attached to controlling cable 76. This cable 76 extends up to a control device 77. This control device has a weighted lever 78 to which the upper end of the cable 76 is attached, and this lever has a bar, for example, a roller 79 which rests against the straight run 5 of the cable which is located above the guide sheave or pulley 6. The weight 80 of the lever 78 tends to swing the lever 78 on its pivot pin 81 in an anti-clockwise direction, but this, of course, is normally prevented by the cable. However, if the cable should break, the arm 78 will be pulled upwardly by the descent of the weight 80 so that the lever will assume the position indicated in the dotted lines in Figure 16. This will give a jerk to the cable 76 and will pull the toggle links 71 over to the position in which they are indicated in Figure 15. The spider 70 will then descend by gravity and the links 70a which normally support the jaw 65 will let the jaws fall. When the jaws fall the toggle arms 67, of course, move them against the side of the pump rod so that they will grip the pump rod and hold it up.

Figure 14:
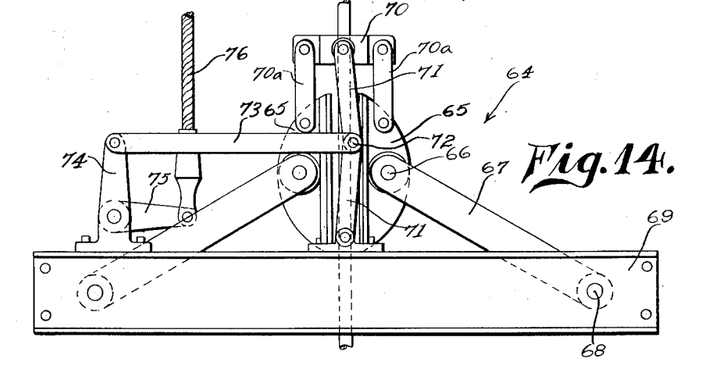
Figure 14 is a side elevation of the grip device shown in Figure 13 and illustrates the device in its open or normal position during which it permits the pump rod to pass freely through it.
Figure 15:
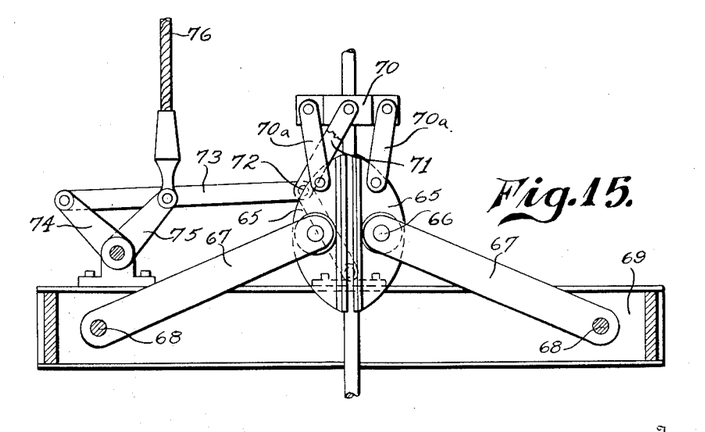
Figure 15 is a view similar to Figure 14 but showing certain parts in section and illustrating the gripping device in its operating position, that is to say, in the position which enables the jaws of the device to grip the pump rod and support it.

In connection with Figure 14, it should be noted that the pin 72 which connects the toggle links 71 is disposed to the right of the pump rod, and hence the action of gravity on the spider 70 and the jaws exerts tension in the link 73, which operates to maintain the spider in its elevated position.

I shall now describe the general mode of operation of the apparatus. For convenience, the cycle of movement of the pump rod may be considered as commencing when the switch lever 20 has been moved into its neutral position. When this occurs the pump rod commences to descend by gravity, and the descent of the rod operates to uncoil the cable from one end of the drum 7. When the pump rod commences to descend, one of the arms, for instance, the arm 36, commences its backward oscillation, that is to say, it will be swinging in an anti-clockwise direction. At this time the pin 46 will be located above the cam 40, as indicated by the dotted lines in Figure 7. As the downward movement of the pump rod progresses, the pin 46 will strike the cam face 47 and swing the lever 20 from its neutral position toward the right. This will close the circuit through the wires 25 and supply current to the motor to drive it in the same direction in which it is then rotating. However, the motor is designed to run at a given speed, and if the descent of the rod tends to accelerate the motor beyond this point, the motor will act as a generator brake and generate the electric current which flows into the circuit.

When the downstroke terminates, the momentum of the rod is gradually arrested and the upstroke is gradually commenced through the medium of the cams 17b and 17a. In other words, by reason of the fact that the end of the chain 16 is attached relatively near the axis of the drum, the cam face will operate to gradually stop the downward movement of the pump rod. The momentum of the drum and the action of the electric current will continue the rotation of the drum in the same direction and wind up the cable on the other side of the drum and on the other end of the drum.

When the upstroke of the pump rod is terminating, the pin 44 will strike the cam 41, or the pin 48 will strike the cam 43, so as to move the switch lever to its neutral position.

It will be evident that, with a pump having the characteristic features described above, the stroke of the pump is only limited by the height of the derrick. It will be evident, however, that by adjusting the position of the arms 36 and 37 on the shaft 32, the stroke of the pump may be made as short as desired. In this way the pump can be adapted to special conditions existing at the well to which it is applied.

In the operation of my apparatus it is advantageous to close the motor circuit after the motor has already started to rotate in the reverse direcion. In this way the danger of burning out the motor is avoided.

It is understood that the embodiment of the invention described herein is only one of the many embodiments this invention may take, and I do not wish to be limited in the practice of the invention, nor in the claims, to the particular embodiment set forth.

What I claim is:

1. In apparatus for reciprocating a weight in a vertical plane, the combination of a drum, a cable connected with the weight and having coils on the drum, said parts cooperating on the downward travel of the weight to rotate the drum, and means operating immediately at the end of the downward travel to maintain the rotation of the drum and continue the rotation of the drum in the same direction and coil the cable on the drum to raise the weight for the upward travel.

2. In apparatus for reciprocating a weight in a vertical plane, the combination of a drum, a cable connected with the weight and having coils on the drum, said parts cooperating on the downward travel of the weight to rotate the drum, a motor constantly connected with the drum, and automatic means operating at the end of the downward travel to continue the rotation of the motor in the same direction and coil the cable on the drum to raise the weight for the upward travel.

3. In apparatus for reciprocating a weight in a vertical plane, the combination of a drum, a cable connected with the weight and having coils on the drum, said parts cooperating on the downward travel of the weight to rotate the drum, an electric motor connected with the drum so as to be rotated thereby on the said downward travel of the weight, automatic means for maintaining the operating circuit of the motor closed during a portion of the downward travel to enable the motor to operate as a generator brake to prevent undue acceleration of the weight and drum, said motor operating at the end of the downward travel to continue the rotation of the drum in the same direction and coil the cable on the drum to raise the weight in its upward travel.

4. In apparatus for reciprocating a weight in a vertical plane, the combination of a drum, a cable connected with the weight and having coils on the drum, said parts cooperating on the downward travel of the weight to rotate the drum, an electric motor, an electric circuit passing through the same, said circuit being closed during part of the said downward travel to enable the motor to operate as a brake to prevent undue acceleration of the drum and weight, said electric motor operating as a motor at the end of the downward travel to continue the rotation of the drum in the same direction and coil the cable on the drum to raise the weight in its upward travel.

5. In apparatus for reciprocating a weight in a vertical plane, the combination of a drum, a cable connected with the weight and having coils on the drum, said parts cooperating on the downward travel of the weight to rotate the drum, an electric motor, an electric circuit passing through the same, means for maintaining said circuit closed during part of the said downward travel to enable the motor to operate as a generator brake to prevent undue acceleration of the drum and weight, said electric motor operating as a motor at the end of the downward travel to continue the rotation of the drum in the same direction and coil the cable on the drum to raise the weight for the upward travel, and automatic means for opening the circuit and maintaining the same open at the commencement of each downward travel of the weight.

6. In apparatus for reciprocating a weight in a vertical plane, the combination of a drum, a cable connected with the weight and having coils on the drum, said parts cooperating on the downward travel of the weight to rotate the drum, an electric motor, an electric circuit passing through the same, a switch for the circuit, automatic controlling means for the switch operating to open the switch at the end of the upward travel of the weight and maintain the same open until after the commencement of the downward travel, said weight operating during the downward travel to descend by gravity and rotate the motor in a reverse direction, said switch controlling means operating to close the switch after the direction of rotation of the motor has been reversed, to enable the motor to operate thereafter as a generator-brake on the downward travel to prevent undue acceleration of the drum and weight, said motor operating at the end of the downward travel to coil the cable on the drum and raise the weight for the upward travel.

7. In apparatus for reciprocating a weight in a vertical plane, the combination of a drum, a cable connected at one end to the weight and at the other end to the face of the drum and having coils wrapped on the drum in a certain direction, said parts cooperating on the downward travel of the weight to enable the weight to descend by gravity, rotate the drum, and uncoil the cable, and means operating immediately at the end of the downward travel to maintain the rotation of the drum and continue the rotation of the drum in the same direction to coil the cable on the drum in the opposite direction, to raise the weight in its upward travel.

8. In apparatus for reciprocating a weight in a vertical plane, the combination of a drum, a cable connected at one end to the weight and at the other end to the face of the drum and having coils wrapped on the drum in a certain direction, said parts cooperating on the downstroke of the weight to enable the weight to descend by gravity, rotate the drum and uncoil the cable, means operating immediately at the end of the downward stroke to maintain the rotation of the drum and continue the rotation of the drum in the same direction to coil the cable on the drum in the opposite direction, to raise the weight for the upstroke, and means associated with the connection between the cable and the drum operating to effect the gradual stopping of the downward travel and the gradual commencement of the upward travel.

9. In apparatus for reciprocating a weight in a vertical plane, the combination of a drum, a cable connected at one end to the weight and at the other end to the face of the drum and having coils wrapped on the drum in a certain direction, said parts cooperating on the downward travel of the weight to enable the weight to descend by gravity, rotate the drum, and uncoil the cable, means operating immediately at the end of the downstroke to maintain the rotation of the drum and continue the rotation of the drum in the same direction to coil the cable on the drum in the opposite direction, to raise the weight for the upward travel, said drum having a cam face at its point of connection to the cable, operating to stop gradually the downward movement of the weight at the end of the downward travel and start the upward travel gradually.

10. In apparatus for reciprocating a weight in a vertical plane, the combination of a drum, a cable attached at one end to the weight, having a chain at its other end attached to the face of the drum and having coils wrapped on the drum in a certain direction, said parts cooperating on the downward travel of the weight to enable the weight to descend by gravity to rotate the drum and uncoil the cable, means operating immediately at the end of the downward travel to maintain rotation of the drum and continue the rotation of the drum in the same direction to coil the cable on the drum in the opposite direction, to raise the weight for the upward travel, said drum having a cam face adjacent the point of attachment of the chain operating to effect the gradual arrest of the downward travel of the weight and the gradual commencement of the upward travel.

11. In apparatus for reciprocating a weight in a vertical plane, the combination of a drum, a cable having one of its ends connected to the weight and having its other end connected to the drum at an intermediate point on the drum, said cable drum and weight cooperating in each cycle of movement of the weight to uncoil the cable from one end of the drum and immediately without stopping the drum, coil the cable on the other end of the drum.

12. In apparatus to reciprocate a weight in a vertical plane, the combination of a drum, a cable having one of its ends connected to the weight and its other end connected to the drum at an intermediate point on the drum, said cable drum and weight cooperating in each cycle of movement of the weight to uncoil the cable from one end of the drum and immediately coil it on the other end of the drum, said drum having a cam face at the point of connection of the cable operating to effect the gradual stopping of the weight at the end of its downward travel and the gradual starting of the next upward travel.

13. In apparatus for reciprocating a weight in a plane, the combination of a drum with a recess in its surface at a point on its circumference and at an intermediate point on the length of the drum, a cable attached to the drum in said recess, said drum constructed to guide the cable to coil the same on either end of the drum, and having a cam face adjacent the point of attachment of the cable to regulate the speed of the cable as the coiling point passes the point of attachment of the cable, said cam face extending circumferentially on the drum from its surface inwardly into the recess.

14. In apparatus for reciprocating a weight in a vertical plane, the combination of a drum, a weight, a cable supporting the weight and connected to the drum, a motor operating to drive the drum in a forward direction to coil the cable on the drum in one direction and raise the weight, automatic means for shutting off the operating fluid of the motor as the weight approaches the end of its upward travel, thereby enabling the weight to rotate the drum and the motor in a reverse direction, and automatic means for supplying the operating fluid to the motor while the weight is near the lower end of its stroke, thereby enabling the motor to continue the rotation of the drum in the said reverse direction and coil the cable upon it in the other direction for the upward travel.

15. In apparatus for reciprocating a weight in a vertical plane, the combination of a drum, a cable supporting the weight from above and connected to the drum at an intermediate point on its length, a motor operating to drive the drum in a forward direction to coil the cable on one end of the drum and raise the weight for the upward travel automatic means for shutting off the operating fluid to the motor as the weight approaches the end of its upward travel thereby enabling the weight to rotate the drum and the motor in a reverse direction and uncoil the cable from the drum, and automatic means for supplying the operating fluid to the motor as the weight approaches the end of its downward travel, enabling the motor to continue the rotation of the drum in the said reverse direction and coil the cable upon the other end of the drum for the next upward travel.

16. In apparatus for reciprocating a weight in a vertical plane, the combination of a drum, a cable attached at one end to the drum at an intermediate point on the length of the drum and operating to be taken up in coils first on one end and then on the other end of the drum, said cable connected with the weight to support the same, an electric motor for driving the drum, a double-throw switch having a position to close a circuit through the motor to drive it in one direction, and having a second position for closing a circuit to drive the motor in the other direction, and automatic means for actuating the switch at the end of the upward travel of the weight to open one of the circuits and thereafter close the other circuit.

17. In apparatus for reciprocating a weight in a vertical plane, the combination of a drum, a cable attached to the drum at an intermediate point on its length and capable of being taken up in coils on either end of the drum, said cable connected with the weight for supporting the same, an electric motor for driving the drum, a double-throw switch having a position to close a circuit through the motor to drive it in one direction and having a second position to drive the motor in the other direction, and means moving in unison with the drum operating to move the switch to open one of the circuits and leave the switch temporarily in a neutral position to enable the weight to descend by gravity, and operating to move the switch thereafter, to close the other circuit after the weight has commenced its descent, thereby enabling the motor to act as a generator brake for the descending weight.

18. In apparatus for reciprocating a weight in a vertical plane, the combination of a drum, a cable attached to the drum at an intermediate point on the drum and capable of being taken up in coils on either end of the drum, said cable connected with the weight for supporting the same, an electric motor for driving the drum, a double-throw switch having a lever capable of assuming a position to close a circuit through the motor to drive it in one direction and having a second position for closing a circuit to drive the motor in the other direction, an actuator for the switch-lever driven in unison with the drum, said actuator having means for moving the switch lever to open the motor circuit at the end of the upward travel of the weight to permit the weight to descend by gravity and reverse the direction of rotation of the drum, said actuator having adjustable means for actuating the switch lever after the weight commences its descent, to close the circuit through the motor for driving it in the other direction, thereby enabling the motor to act as a generator brake for the descending weight.

19. In apparatus for reciprocating a weight in a vertical plane, the combination of a drum, a cable with coils on the drum and attached to the weight to enable the weight to be raised by the cable or lowered by gravity with the cable, and so that the cable uncoils from the drum when the weight is being lowered and means operating immediately at the end of the downward movement to maintain the rotation of the drum and continue the rotation of the drum in the same direction to coil the cable on the drum to raise the weight.

20. In apparatus for reciprocating a weight in a vertical plane, the combination of a drum, a cable with coils on the drum, said cable connected to the weight, and said parts cooperating in the downward movement to enable the weight to descend by gravity and rotate the drum, and means operating immediately at the end of the downward movement to maintain the rotation of the drum and continue the rotation of the drum in the same direction to coil the cable on the drum to raise the weight.

21. In apparatus for reciprocating weight in a vertical plane, the combination of a drum having a recess in its surface at a point on its circumference and at an intermediate point on the length of the drum, a cable attached to the drum in said recess and capable of being taken up in coils first in one end of the drum and then on the other end of the drum, a weight supported on the cable, an electric motor for driving the drum and operating to maintain the rotation of the drum when the weight reaches the length of its downward travel so as to coil the cable on the drum and a safety device controlled by the cable and operating to prevent the weight from falling if the cable becomes detached from the drum.

22. In apparatus of the character described, the combination of: a winding drum, a working member suspended by a cable from said drum, a motor for driving the drum, and automatic reversing means interposed between the motor and the drum for effecting successive reversals of the drum rotation, said means interrupting the motor power at a predetermined point in the hoisting movement of the drum and delaying the restoration of the motor power thereby permitting reversal of the drum rotation by the gravity pull of said suspended working member and then reapplying the motor power for said reversed drum rotation.

23. In apparatus of the character described, the combination of: a winding drum, a working member suspended by a cable from said drum, a power energy supply, a motor for driving the drum, and automatic reversing means interposed between the motor and the drum for effecting successive reversals of the drum rotation, said means first cutting off the power energy supply to the motor at a predetermined point in the hoisting movement of the drum, then delaying the restoration of the power energy supply thereby permitting reversal of the motor rotation by the gravity pull of said suspended working member and then restoring the power energy supply to the motor.

GEORGE D. PARKER.